(12) United States Patent
Skallebæk et al.

(10) Patent No.: US 8,596,140 B2
(45) Date of Patent: Dec. 3, 2013

(54) FLOW METER WITH ULTRASOUND TRANSDUCER DIRECTLY CONNECTED TO AND FIXED TO MEASUREMENT CIRCUIT BOARD

(75) Inventors: Anders Skallebæk, Skanderborg (DK); Peter Schmidt Laursen, Skanderborg (DK); Søren Tønnes Nielsen, Solbjerg (DK)

(73) Assignee: Kamstrup A/S, Skanderborg (DK)

( * ) Notice: Subject to any disclaimer, the term of this patent is extended or adjusted under 35 U.S.C. 154(b) by 201 days.

(21) Appl. No.: 13/262,575

(22) PCT Filed: Mar. 25, 2010

(86) PCT No.: PCT/DK2010/050068
§ 371 (c)(1),
(2), (4) Date: Sep. 30, 2011

(87) PCT Pub. No.: WO2010/112030
PCT Pub. Date: Oct. 7, 2010

(65) Prior Publication Data
US 2012/0031198 A1  Feb. 9, 2012

(30) Foreign Application Priority Data

Apr. 2, 2009  (EP) .................................... 09157174
Dec. 18, 2009  (EP) .................................... 09179932

(51) Int. Cl.
*G01F 1/20* (2006.01)

(52) U.S. Cl.
USPC ..................................................... 73/861.18

(58) Field of Classification Search
USPC .............................. 73/861.18, 861.19, 861.23
See application file for complete search history.

(56) References Cited

U.S. PATENT DOCUMENTS

| 4,306,121 A * | 12/1981 | Joscelyn et al. .............. 381/395 |
| 2008/0236296 A1 | 10/2008 | Sonnenberg et al. |
| 2008/0271543 A1 | 11/2008 | Hecht et al. |

FOREIGN PATENT DOCUMENTS

| DE | 20 2007 011 493 U1 | 11/2007 |
| EP | 2 042 837 A1 | 4/2009 |
| EP | 2 339 301 A1 | 6/2011 |
| GB | 2 359 140 A | 8/2001 |
| WO | WO 2005/091433 A1 | 9/2005 |
| WO | WO 2008/053193 A1 | 5/2008 |
| WO | WO 2009/029533 A1 | 3/2009 |

OTHER PUBLICATIONS

European Search Report for EP 09 15 7174 dated Jun. 25, 2009.
European Search Report for EP 09 17 9932 dated Aug. 9, 2010.

*Primary Examiner* — Jewel V Thompson

* cited by examiner

(74) *Attorney, Agent, or Firm* — Knobbe Martens Olson & Bear, LLP

(57) ABSTRACT

An ultrasound flow meter unit arranged to measure a fluid flow rate with one or more ultrasound transducers (606), and a circuit board (602) with an electronic circuit arranged to operate the ultrasound transducer(s) (106, 306). The ultrasound transducer (606), e.g. in the form of a piezo-electric element, is mechanically fixed to the circuit board (602) by a first electrically conducting fixing means which additionally serve(s) to provide an electrical connection between an electrical terminal of the transducer (606) and the electronic circuit. Hereby a functional flow measurement unit (600) is provided which can be tested prior to assembly with a flow meter housing etc. Preferably, a set of ultrasound transducers (106, 306) are soldered directly onto electrically conducting paths (631) on a surface of the circuit board (602) being in electrical connection with the electronic circuit, e.g. in a single SMT mounting process together with mounting of all other electronic components on the circuit board (602). Through-going openings (630, 640) of the circuit board (602) in the vicinity of these conducting paths (631) serve to provide thermal elasticity. A metal clip soldered to the circuit board (602) may serve to electrically connect a second electrical terminal of the transducer (606) to the electronic circuit.

17 Claims, 8 Drawing Sheets

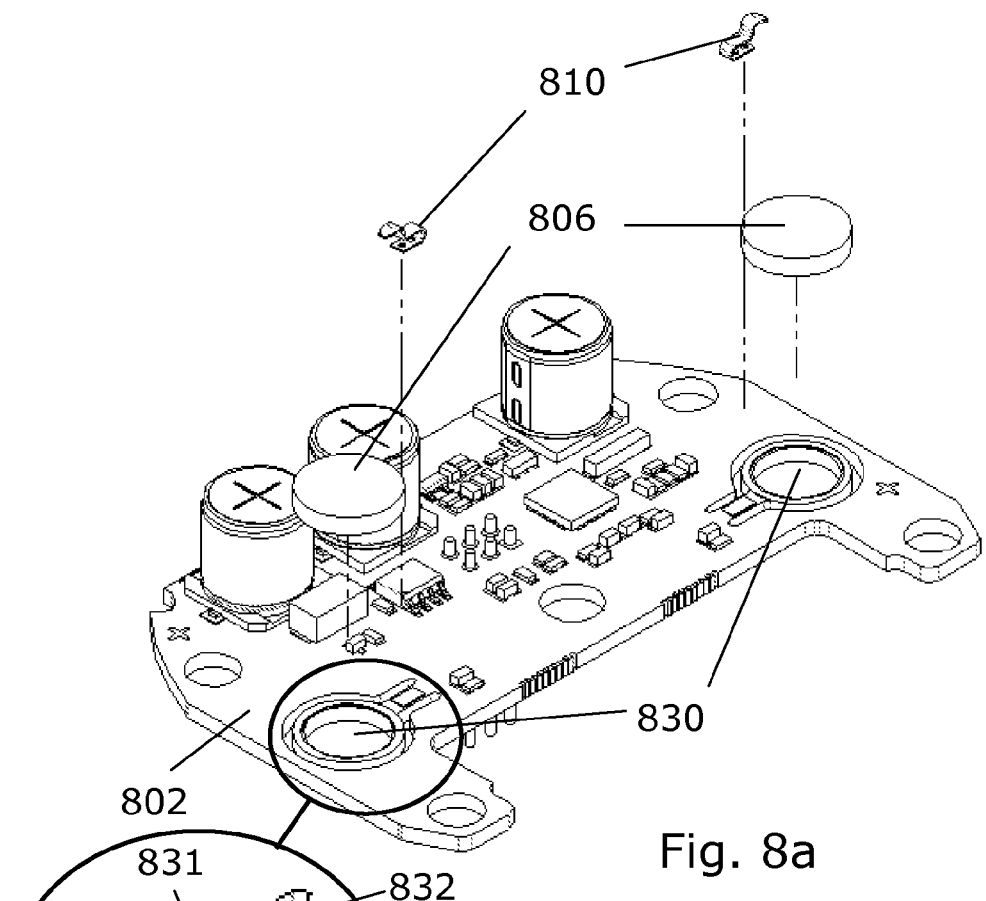
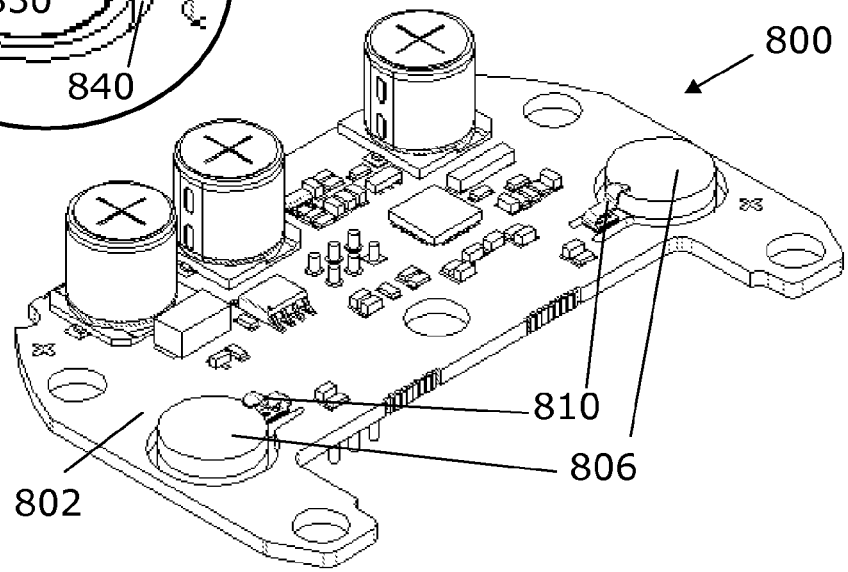
Fig. 8a
Fig. 8b

FLOW METER WITH ULTRASOUND TRANSDUCER DIRECTLY CONNECTED TO AND FIXED TO MEASUREMENT CIRCUIT BOARD

CROSS REFERENCE TO RELATED APPLICATIONS

This application claims the benefit and priority to and is a U.S. National Phase Application of PCT International Application Number PCT/DK2010/050068, filed on Mar. 25, 2010, designating the United States of America and published in the English language, which is an International Application of and claims the benefit of priority to European Patent Application No. 09157174.5, filed on Apr. 2, 2009, and European Patent Application No. 09179932.0, filed on Dec. 18, 2009. The disclosures of the above-referenced applications are hereby expressly incorporated by reference in their entireties.

FIELD OF THE INVENTION

The invention relates to an ultrasound flow meter for ultrasonic measurements of fluid flow, such as ultrasound flow meters for consumption meters. In particular the invention provides an ultrasound flow meter with measurement circuit board with an ultrasound transducer electrically connected and fixed thereto.

BACKGROUND OF THE INVENTION

Normally, ultrasound flow meters suited for measuring a fluid flow in connection with charging of a consumed quantity (e.g. heat, cooling, water or gas) will have a housing, which can be metallic or polymeric, with a cavity in the form of a through-going hole for receiving a fluid flow to be measured. Connection means to other fluid flow elements are present in each of the housing ends.

In the housing a number of ultrasound transducers are installed for measuring the velocity of the fluid flow. In most flow meters two ultrasound transducers are used for sending, respectively receiving, an ultrasound signal, but versions with one ultrasound transducer, as well as versions with more than two ultrasound transducers, are seen. Furthermore, a measurement circuit, i.e. an electronic circuit for operation of the ultrasound transducers, is typically mounted in a separate enclosure and fastened to the housing. Most often the electronic circuit is implemented on a Printed Circuit Board (PCB).

The ultrasound transducers can be electrically connected to the electronic control circuit in various ways. Common methods being soldering ends of connection wires onto the ultrasound transducers directly and onto the PCB respectively, or using a plug connection between the same. However, one common problem with prior art ultrasound flow meters is that, during manufacturing, it is required that the flow meter is completely assembled before a meaningful test of the flow meter can be performed. Species that fail in such test procedure are thus revealed at a late state in the manufacturing process, and thus assembly time is wasted for such species.

SUMMARY OF THE INVENTION

In view of the above, it may be seen as an object of the present invention to provide an improved ultrasound flow meter for ultrasonic measurement of a fluid flow and an improved method of manufacturing of a flow meter which enables testing prior to final assembly.

Accordingly, the invention provides, in a first aspect, an ultrasound flow meter unit according to claim 1.

Thus, an improved ultrasound flow meter unit for ultrasonic measurement of a fluid flow is provided. In particular, it may be seen as an improvement that integration of parts involved with the positioning and the mounting of the ultrasound transducer is achieved, as the circuit board, together with the fixing means, serves to both fix and electrically connect the ultrasound transducers to the circuit board, thus forming a mechanically separate unit which can be easily tested prior to the final assembly steps of mounting this unit on a flow meter housing, such as a housing with a measuring tube arranged inside a through-going opening, or such as a housing with the measuring tube integrated therein. This is essential for effective production, since the mechanically separate unit including transducer(s) and circuit board can be tested before final assembly of the mechanically separate unit and the housing. Hereby, the production cost can be lowered since failing species are revealed at an early state, and in addition the rather complex handling of wires and connecting of wires between transducer(s) and circuit board in automated manufacturing has been eliminated. Also, a more reliable flow meter can be achieved due to fewer parts and connections. Moreover, this can also lead to an increase in lifetime of the ultrasound flow meter. In addition, higher precision is possible as a result of reduced tolerances.

Furthermore, a direct mounting of the ultrasound transducer to the circuit board reduces the number of components required for fixing and electrically connecting the ultrasound transducer to the circuit board, and thus eliminating components will help to save space and thereby allow for a compact flow meter. Especially, it is preferred that the ultrasound transducer in the form of a monolithic body of piezo-electric material is fixed and electrically connected directly on a surface of the circuit board, thus resulting in a very compact ultrasound measurement unit with few single components.

In addition, by using fixing means serving to both mechanically fixing and electrically connecting the ultrasound transducer enables elimination of several steps in the manufacturing process involving mounting of the ultrasound transducers. Furthermore, by a direct and permanent fixing and electrical connection of at least one electrical terminal of the ultrasound transducer to the measurement circuit eliminates the need for handling of fragile wire connection of the ultrasound transducer. Hereby the manufacturing process is facilitated, and a source of functional error in the final flow meter is eliminated since wire connections are mechanically vulnerable and can easily break, thus causing break-down of the flow meter.

Still further, by the defined fixing and electrical connection of ultrasound transducer(s), it is possible to provide a compact ultrasound measurement unit which includes an electrical interface such as in the form of a one-plug connection comprising two, three or four electrical pins serving to provide all necessary external electrical connections, preferably including one electric terminal communicating a measured fluid flow rate, such as in the form of electric pulses with a rate corresponding to the measured fluid flow rate. Hereby, it is possible to provide a compact ultrasound measurement unit is provided which is both easy to test, but which also provides a high degree of versatility for integration into a large variety of applications. Such flow meter unit may include a battery electrically connected to the circuit board so as to allow the flow meter unit to operate as a stand-alone measurement unit. However, for other applications, it may be preferred to electrically power the electronic circuits on the circuit board through the electrical interface terminals. In some applications, the electrical interface of the unit may be in the form of a wireless communication module, e.g. a wireless Radio Frequency module for transmitting data representing the measured fluid flow rate.

When used as part of a consumption meter, the circuit board of the flow meter may include all of or at least part of the necessary electronic components required to implement a calculation circuit arranged to determine a consumed amount of a physical entity, based on the fluid flow rate from the flow meter. However, it may also be preferred to provide the calculation circuit facilities in a separate unit connected to the flow meter with one of the mentioned electrical interface options.

Preferably, the fixing means includes solder or electrically conductive glue or adhesives, and especially, the ultrasound transducer(s) can be fixed and electrically connected in a Surface Mounting Technology (SMT) process, e.g. together with the mounting of electronic components forming the electronic circuits on the circuit board. Such process can be performed manually, however using SMT mounting, the flow meter is suited for automated mass production using known production equipment with high precision positioning of the ultrasound transducers. Thus, in two-transducer versions, the ultrasound transducer can be positioned precisely relative to each other and relative to the circuit board, thereby facilitating final assembly with a flow meter housing prepared for receiving the circuit board and the transducers.

The first fixing means preferably comprises at least one of: solder, electrically conducting glue, and an electrically conducting clip. E.g. different types of these fixing means may be used to fix and connect the first and a second electrical terminal of the ultrasound transducer. Preferably, the piezo-electric element of the ultrasound transducer is directly fixed and electrically connected to a conductive path on a surface of the circuit board, thereby providing a very compact and simple combined mechanical and electrical interconnection of the circuit board and the ultrasound transducer.

Preferably, the first fixing means serves to electrically connect the first electrical terminal of the first ultrasound transducer to an electrically conducting path on a surface of the circuit board, wherein the electrically conducting path is electrically connected to the electronic circuit. Especially, said conducting path may be shaped to fit at least part of a geometry of the first electrical terminal of the first ultrasound transducer.

The first ultrasound transducer may have a substantially flat surface arranged for facing the circuit board, when fixed thereto. Especially, the first ultrasound transducer may have a substantially circular or rectangular outer shape and have first and second electrical terminals arranged on respective opposite flat surfaces. The circular shaped ultrasound transducer may be preferred, since it is a very easy shape to handle for automated manufacturing machinery, such as robots. As an alternative, the first ultrasound transducer may have a circular shape and may have the first and second electrical terminals placed concentrically in relation to each other. This enables full electrical connection of the ultrasound transducer to the circuit board in a simple SMT mounting process using only one side of the transducer for both electrical terminals.

In some embodiments, a first conducting path is electrically connected to the first electrical terminal of the first transducer, and a second conducting path on the surface of the circuit board serves to electrically connect the electronic circuit with a second electrical terminal of the first ultrasound transducer. Especially, a metal clip may serve to electrically connect the second conducting path to the second electrical terminal of the first ultrasound transducer, e.g. while the first electrical terminal of the transducer is directly soldered or conductively glued to the first conducting path. Especially, such metal clip may be soldered to the second conducting path, e.g. in one and the same SMT process as all other components on the circuit board, and wherein the metal clip is shaped such that electrical connection to the second electrical terminal of the first ultrasound transducer requires application of an external force. Thus, the metal clip may be bend into shape such that it is not in contact with the electrical terminal of the ultrasound transducer during mounting. Hereby the clip is suited for SMT mounting, and upon mounting on a housing, the transducer(s) will face a surface of the housing, and thus the clip will be pressed against the second electrical transducer terminal and thus provide contact.

Alternative to the metal clip solution, both of the first and second conducting paths may be electrically connected to the respective first and second electrical terminals by means of solder or electrically conducting glue.

The circuit board may have one or more through-going openings partly or entirely covered by the first ultrasound transducer when fixed to the circuit board, such as a part of the conducting path being arranged in vicinity of at least one of said through-going opening(s) in the circuit board. Hereby it is possible for the circuit board to adapt to thermal extensions and contractions of the piezo-electric ultrasound transducer element.

In many applications, such as small flow meters, the meter unit may further comprise a second ultrasound transducer, wherein the electronic circuit is further arranged for operating the second ultrasound transducer, wherein the second ultrasound transducer is mechanically fixed to the circuit board by a second electrically conducting fixing means which additionally serve(s) to provide an electrical connection between at least one electrical terminal of the second ultrasound transducer and the electronic circuit, and wherein both of the first and second ultrasound transducers are mechanically fixed to the same side of the circuit board. A reflector may be arranged so as to guide ultrasound signals between the two ultrasound transducers in a direction up-stream or down-stream of the fluid flow.

In such two-transducer versions, a substantially watertight membrane or casing may be arranged around the circuit board and the first and second ultrasound transducers so as to provide a highly versatile stand-alone flow meter unit. Due of the water-tight casing, the critical electrical parts are sealed against humidity which is a problem, e.g. in cooling consumption meters. A plug with a plurality of electrical terminals may penetrate through said membrane so as to allow external connection to the electronic circuit. At least a part of said membrane may be electrically conducting and serve to electrically connect a second electrical terminal of the first ultrasound transducer with a second electrical terminal of the second ultrasound transducer. Hereby, the membrane can serve to electrically connect the second electrical terminals of the two transducers to the electronic circuit, e.g. to form a common electrical ground connector for the transducers. Thus, in embodiments where the first electrical terminals of both transducers are soldered to the circuit board, the need for wires or clips is eliminated.

The circuit board is preferably substantially plane at least in an area where the first ultrasound transducer is fixed to the circuit board, such as the circuit board being substantially plane in its entire extension. A normal one or multi-layer printed circuit board (PCB) may be used. Preferably, the circuit board is plane and stiff enough to ensure that two ultrasound transducers mounted thereon are fixed within an acceptable tolerance with respect to relative angular displacement. In other words, a direction of ultrasound emitted from the two ultrasound transducers is preferably not influenced significantly a bending of the circuit board, and thus both ultrasound transducer should be able to emit ultrasound signals perpendicularly to the surface of the plane circuit board.

In two-transducer embodiments, both of the first and second ultrasound transducers may be arranged to emit ultrasonic signals in a direction substantially perpendicular to a direction of fluid in the measurement tube of the ultrasound flow meter. However, in some applications, e.g. in fluid flow meters suited for large fluid flows, it may be preferred to arrange the transducer such that it emits ultrasound signals in another angle, e.g. 20°-80°, with the fluid flow direction.

The ultrasound flow meter might have its housing formed by metal, such as brass or stainless steel. In another embodiment, the ultrasound flow meter has its housing formed by a polymeric material. An advantage of a polymeric material is that it is possible to avoid openings in the housing for the ultrasound transducers, since an ultrasonic signal can be transmitted through a polymer material with the right physical and dimensional properties. Sealing can thus be eliminated, resulting in improved imperviousness of the flow meter, and the pressure forces from the fluid flow will not load the ultrasound transducers but the flow meter housing only.

The invention provides a highly versatile stand-alone unit for a large variety of applications where a flow rate of a fluid is to be measured. A simple electrical interface can be provided, e.g. where the measured flow rate is output as pulses. This interface may be reduced down to one single electrical pin, see e.g. European patent application publication No. EP 2 042 837, e.g. with part of the casing being a metal serving as electrical ground connector. Hereby, the unit is easy to fit into different applications. In some embodiments, a battery is provided within the water-tight casing, thus allowing a completely self-contained flow meter unit with a simple electric interface.

Further, the range of applications is extended due to the rather compact size of the unit, especially in versions where the electronic circuit is refined to allow a high measurement accuracy with a limited distance between the first and second ultrasound transducers, e.g. as described in European patent application EP 2 339 301. This means that the unit can be used in applications where only a limited space is available for the flow rate sensor.

Examples of relevant applications are: consumption meters for charging purposes, measurement of blood flow in medical examination or surveillance, ingredient flow within the food industry, flow of water, air or fuel in a machinery (e.g. a vehicle), flow provided to single sources or groups of heating/cooling elements (or the related heating/cooling power based on measurement of the flow) as feedback to heating/cooling control systems.

In a second aspect, the invention provides flow meter arranged to measure a flow rate of a fluid flowing through a measuring tube, wherein the flow meter comprises
    a housing with the measuring tube arranged inside, and
    a ultrasound flow meter unit according to the first aspect arranged in relation to the housing.

The flow meter may be in the form of a consumption meter being: a heating meter, a cooling meter, a water meter, or a gas meter. The flow meter may be more or less integrated with parts implementing the consumption meter function, e.g. housed within one common casing or wired or wirelessly connected in separate casings.

In a third aspect, the invention provides a method of manufacturing an ultrasound flow meter unit of the first aspect.

Preferably, the first electrically conducting fixing means is solder, and wherein the method comprises soldering a metal clip to an electrically conducting path on a surface of the circuit board being in electrical connection with the electronic circuit, wherein the metal clip is arranged for providing electrical connection to a second electrical terminal of the first ultrasound transducer.

Preferably, step c) and a step of mounting electronic components of the electronic circuit to electrically conducting paths on a surface of the circuit board are performed in one SMT process. Especially, said SMT process may comprise mechanically fixing a first ultrasound transducer to the circuit board by a second electrically conducting fixing means which additionally serve(s) to provide an electrical connection between a first electrical terminal of the second ultrasound transducer and the electronic circuit, or to an electrically conducting path on a surface of the circuit board being in electrical connection with the electronic circuit.

In a fourth aspect, the invention provides a method of manufacturing a flow meter of the second aspect.

An advantage of this assembly procedure is that it can be very easily performed and that it can be automated. As only few steps and handling of only few components are required, the process can be carried out in short time.

A specific method of manufacturing comprises mounting the ultrasound transducer to the circuit board by means of one or more clips, such as metal clips. This assembly procedure is simple yet with good positioning accuracy. Few different components are used, and few assembly procedures are involved.

A preferred method of manufacturing comprises soldering the ultrasound transducer to the circuit board, such as by means of an SMT soldering process. By SMT positioning of the ultrasound transducer the high accuracy of the SMT machinery is achieved. The accuracy of positioning is in the order of fractions of a millimeter, such as below 1.0 mm, such as below 0.1 mm, such as below 0.01 mm. Another advantage is that the electrical connection between the circuit board and the at least one ultrasound transducer can be established in connection with mounting, thus eliminating two separate processes for fixing and electrically connecting, respectively.

Another preferred method of manufacturing comprises a step of testing a function of the mechanically separate flow meter unit prior to mounting this unit to the housing arranged for fluid flow. This method of manufacturing is advantageous since testing the function of the mechanically separate unit before mounting the mechanically separate unit to a housing arranged for fluid flow can reveal malfunction. In case of malfunction the product can be scrapped before the cost of the assembly procedure is added and this potentially lowers the overall production costs.

It is appreciated that advantages described for the first aspect applies as well for the other mentioned aspects. Further, embodiments of the first aspects may in any way be combined with the other mentioned aspects.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIGS. 8a and 8b illustrate an SMT embodiment, where an annular conducting path connects to first transducer terminal, while another conductor on the circuit board connects to a metal clip that serves to connect to a second transducer terminal.

DESCRIPTION OF EMBODIMENTS

Figure 1A:
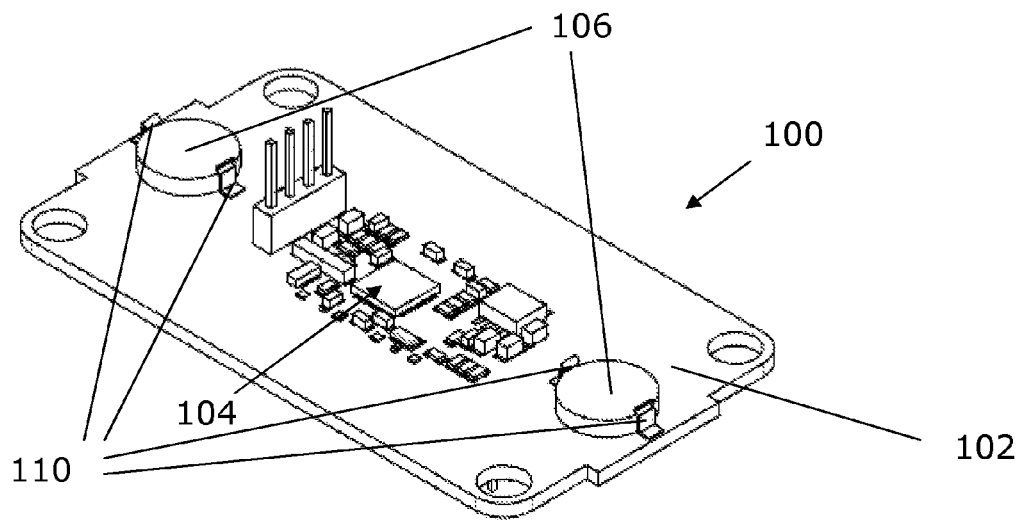
FIGS. 1a and 1b illustrate a mechanically separate unit comprising a circuit board and two ultrasound transducers mounted outside a plane of the circuit board in an assembled and in a pre-assembly state, respectively.

FIG. 1a shows a mechanically separate unit 100 comprising a plane single or multi-layer circuit board 102 with an electronic circuit 104, such as implemented with SMT mounted components, and with cylindrically shaped piezoelectric ultrasound transducers 106 mounted spaced apart and outside a plane defined by the circuit board 102, namely on a surface of the circuit board 102. The ultrasound transducers 106 in the shown embodiment are mounted on top of respective through-going holes of the circuit board 102, however, other embodiments could have cavities which are not through-going, or have planar surfaces without holes. The ultrasound transducers 106 are arranged for radiating ultrasonic signals perpendicular to a plane defined by the circuit board 102.

The electronic circuit 104 is arranged to control the operation of the ultrasound transducers 106 and thus perform ultrasound flow measurements. The electronic circuit 104 may provide an electric output signal in the form of electric pulses with a rate corresponding to the measured flow rate, and/or the electronic circuit 104 may be arranged to output data representing a measured amount of flow, such as by means of a digital electric signal, e.g. on a single wire.

Metallic clips 110 serve as fixing members for fixing a position of the ultrasound transducers 106 and for providing electrical connection to the electronic circuit 104 on the circuit board 102. The metal clips 110 may be SMT soldered to conductive paths on the circuit board 102, however the clips 110 may also be attached to the circuit board by other means such as conductive glue, by means of a screw through the circuit board 102 or the like. Depending on the location of the electrical terminals on the ultrasound transducer 106, the two clips 110 shown for each transducer 106 may either only serve to electrically connect one electrical terminal to the circuit board, or the two clips 110 may serve to electrically connect respective first and second electrical terminals of the ultrasound transducer 106.

The unit 100 including circuit board 102 and transducers 106 can be electrically connected and tested in a test-stand before being mounted on a housing with a measuring tube inside and thus before final assembly of the flow meter.

The unit 100 can be used for mounting on flow meter housings with or without through-going openings to the fluid medium to be measured on. However, in preferred embodiments, the 100 according to the invention is combined with a housing without such through-going opening, i.e. based on transmission of ultrasound signals through the material of the housing according to the so-called matching layer principle. E.g. the housing may be a polymeric housing.

Figure 1B:
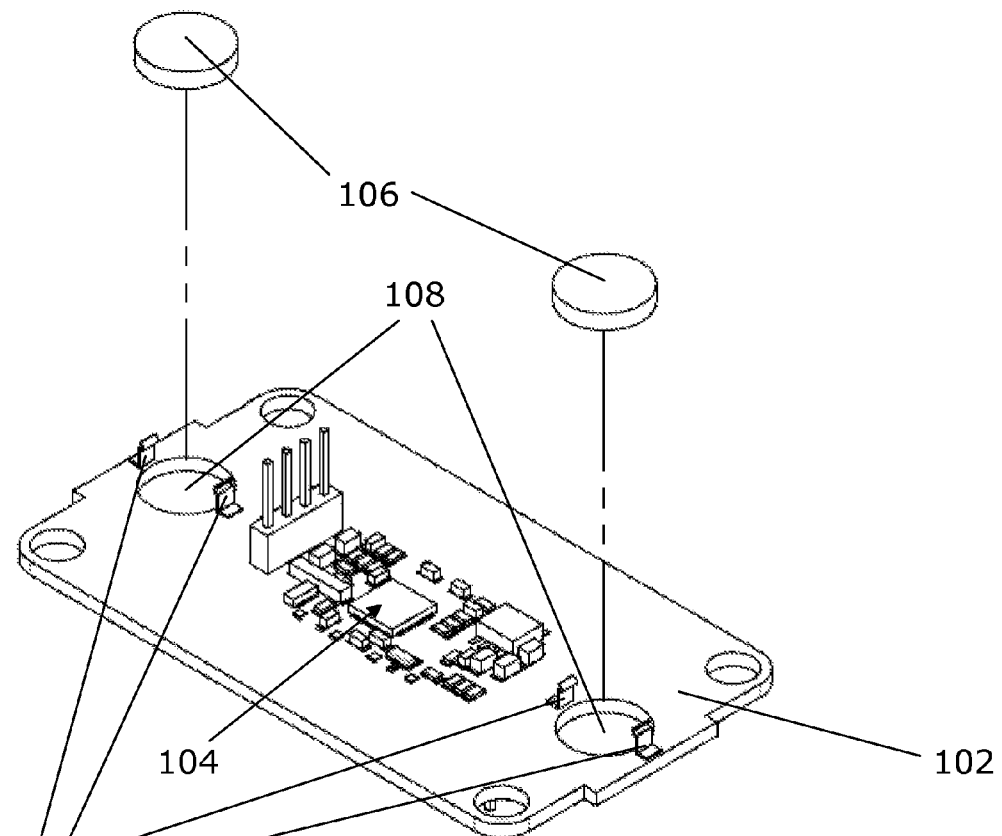

FIG. 1b shows a perspective view of a circuit board 102 as in FIG. 1a, but prior to mounting the ultrasound transducers 106 in relation to the circuit board 102. The clips 110 may be SMT mounted on the circuit board 102 in the same process as the electronic components of the electronic circuit 504, and subsequently the ultrasound transducers 106 are locked into place and electrically connected by means of the clips 110.

As seen, the ultrasound transducers 106 are mounted over respective through-going holes 108 of the circuit board, hereby allowing a contact force to be applied on each of the ultrasound transducers 106, through the plane of the circuit board 102, without applying the force through the material of the circuit board 102.

Figure 2A:
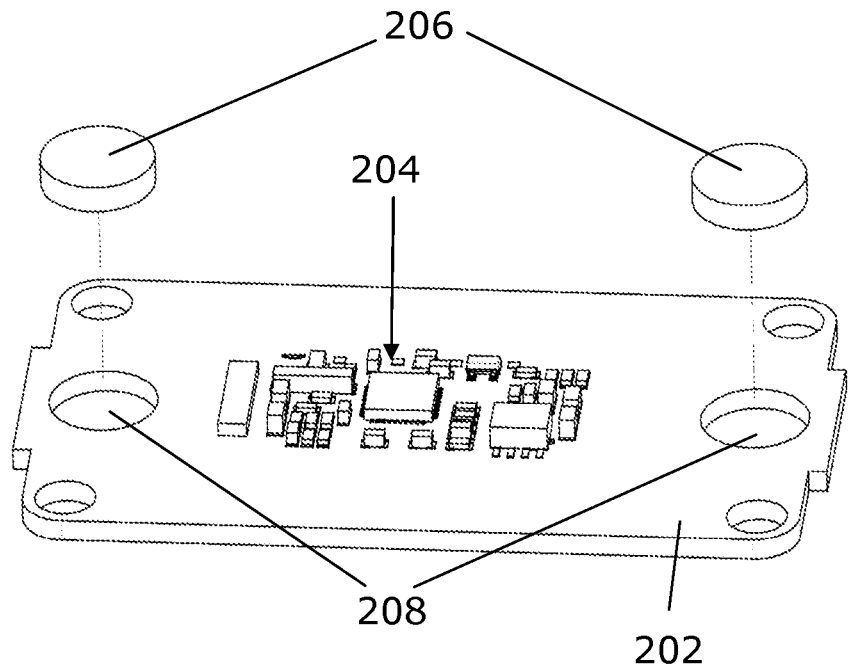
FIGS. 2a and 2b illustrate a circuit board and ultrasound transducers before and after assembly into a mechanically separate part consisting of circuit board and ultrasound transducers mounted in an SMT process.

FIG. 2a shows two ultrasound transducers 206 and a circuit board 202 with an electronic circuit 204 prior to fixing the transducers on the circuit board in an SMD process. In a preferred embodiment suited for SMT fixing of the transducers 206, the circuit board 502 is provided with though-going holes 208 with a circular shape having a diameter smaller than the circular transducers 206, and the holes 208 are placed such that the transducers 206, when mounted, cover the holes 208. However, other embodiments may have cavities, which are not through-going, or plane surfaces without holes or cavities.

Figure 2B:
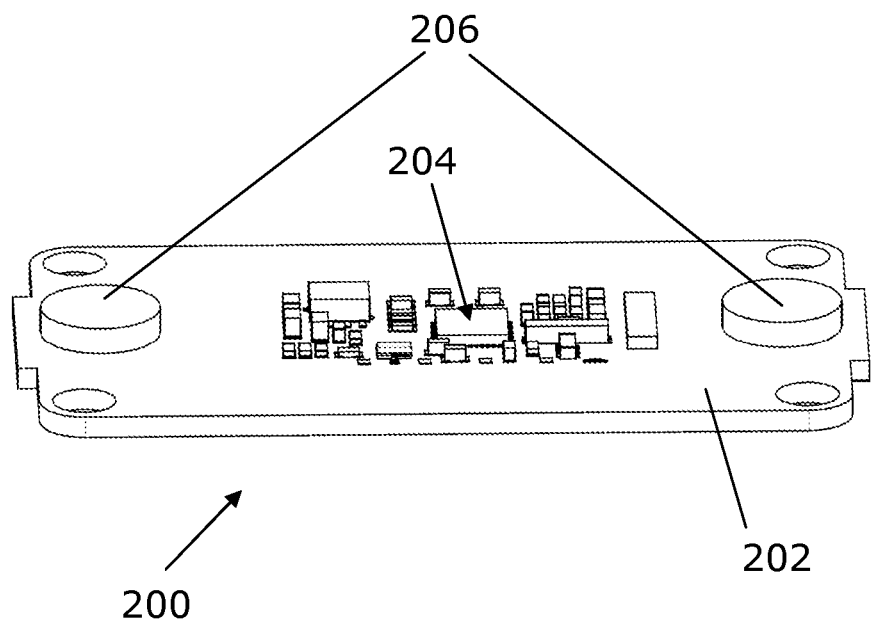

FIG. 2b shows a mechanically separate unit 200 comprising a circuit board 202 with an electronic circuit 204 and two ultrasound transducers 206, where the transducers 206 are fixed on the circuit board 202 in an SMT process. Solder between the circuit board 202 and each of the transducers 206 serves to mechanically fix the transducers 206 to the circuit board 202. Furthermore, the electrically conducting solder connects each of the transducers 206 electrically to the electronic circuit 204.

Figure 3:
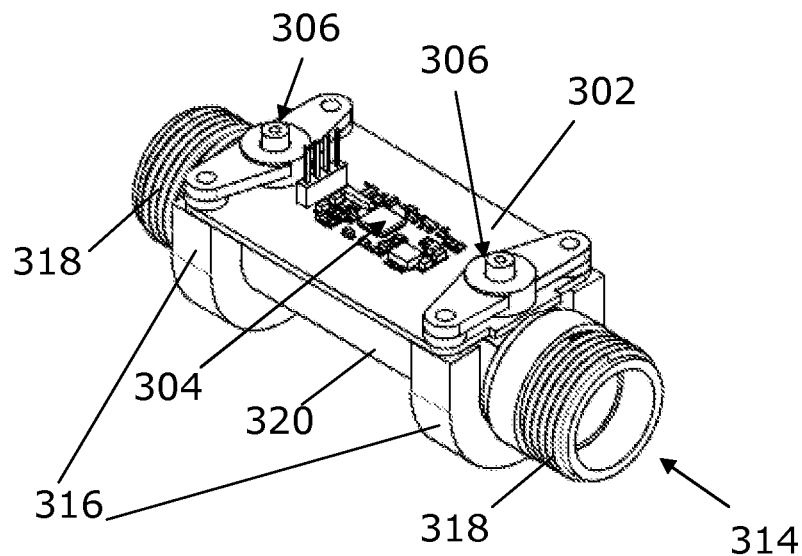
FIG. 3 illustrates an ultrasound flow meter with a flow meter housing made of metal and a mechanically separate unit comprising a circuit board and two ultrasound transducers.

FIG. 3 shows a perspective view of an ultrasound flow meter with a metallic or polymeric flow meter housing 320, with a measuring tube 314 adapted for fluid flow inside, and a mechanically separate part comprising a circuit board 302 with an electronic circuit 304 and two piezoelectric ultrasound transducers 306. The mechanically separate unit comprising the transducers 306 and the circuit board 302 is fixed to the housing 320 with bracings 316 in order to ensure that enough force is applied to the transducers in the direction towards a centre line of the measuring tube in the housing in order to counteract the force applied in the opposite direction from the pressure of the fluid inside the housing during operation. Each end of the flow meter housing 320 is provided with threading 318 in order to facilitate mounting onto adjacent pipelines. The electronic circuit 304 is provided with external connections in the form of pins enabling the electrical connection to other electronic circuits, such as calculator units, power supplies and telecommunication units. Alternatively, a wireless connection could be used.

Figure 4:
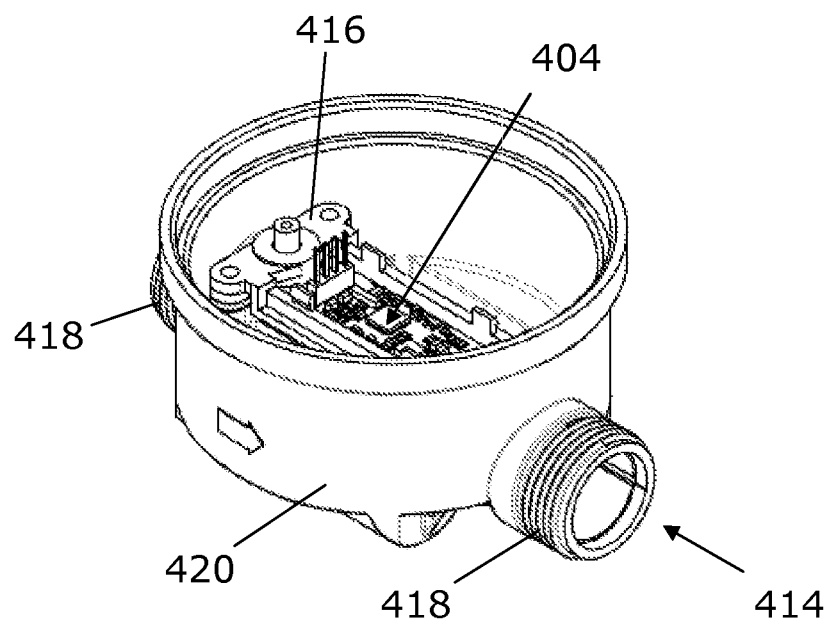
FIG. 4 illustrates an ultrasound flow meter with a flow meter housing made of polymer and a mechanically separate part comprising a circuit board and two ultrasound transducers.

FIG. 4 shows a perspective view of an ultrasound flow meter with a polymeric flow meter housing 420, with a through-going opening 414 adapted for fluid flow and with a measuring tube arranged inside, and a mechanically separate part comprising a circuit board with an electronic circuit 404 and piezoelectric ultrasound transducers. The polymeric flow meter housing 420 is monolithically formed in a die casting process and is enclosing a cavity suited for containing components, such as the electronic circuit 404. This cavity is separated from the through-going opening 414 by a wall, and the ultrasound transducers on the circuit board transmit ultrasound signals through this wall and thus operates according to the so-called matching layer principle. The mechanically separate unit comprising the transducers and the circuit board is clamped to the housing 420 with bracing 416. Each end of the flow meter housing is provided with threading 418 in order to facilitate mounting onto adjacent pipelines. The electronic circuit 404 is provided with external connections in the form of pins enabling the electrical connection to other electronic circuits, such as calculator units, power supplies and telecommunication units. Alternatively, a wireless connection could be used. The shown embodiment can be used as a consumption meter, such as a water meter, a heat meter or a cooling meter.

Figure 5A:
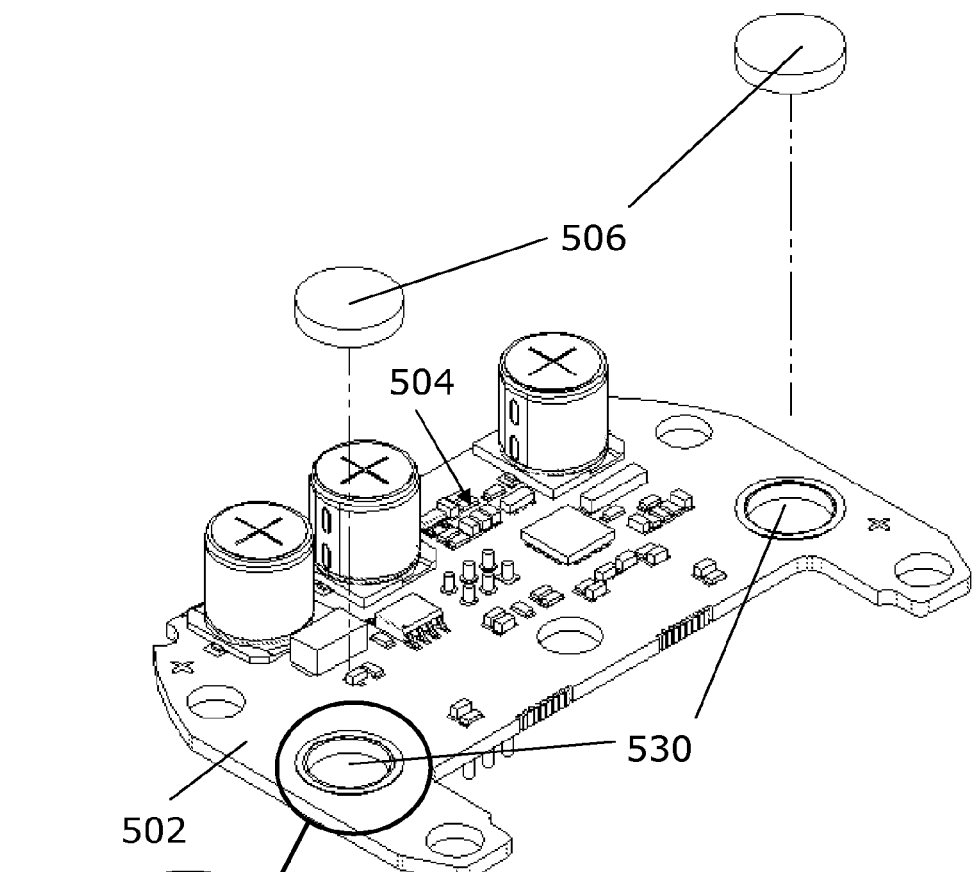
FIGS. 5a and 5b illustrate one SMT embodiment with an annular conducting path arranged around a central hole in the circuit board.
Figure 5B:
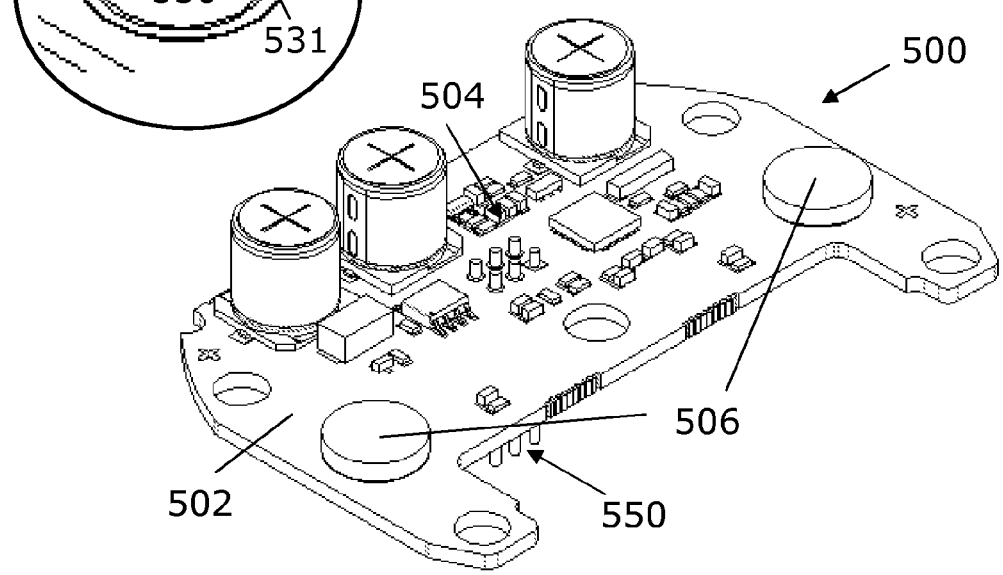

FIGS. 5a and 5b, shows a circuit board 502 embodiment in the form of a unit 500 which can be tested separately, in a pre-assembly state and in an assembled state, respectively. In FIG. 5a a magnified view of the circuit board 502 is included to better show the conductive path 531 arranged around the through-going opening 530 below the ultrasound transducers 506. The shown embodiment is suited for SMT mounting, such as SMT mounting of all electronic components of the measurement circuit 504 and the ultrasound transducers 506 in one SMT mounting process where all components are soldered directly to the circuit board 502. After SMT mounting, the unit 500 is prepared for functional testing, since it can be connected in a test setup via the electrical terminals 550, i.e. the same terminals which are used for electrical connection in the final flow meter or consumption meter, such as connection to a calculator unit. Alternatively, electrically conductive glue may be used to fix and connect the ultrasound transducers 506 to the conductive paths 531 of the circuit board 502.

As seen, the circuit board 502 is plane in its entire extension, and in principle the circuit board 502 may be a simple standard type one, two or more layer circuit board. The holes 530, and the conductive paths 531 around the circular holes 530, serve to determine a position of the ultrasound transducers 506, and thus a distance between the two ultrasound transducers 506 in the final flow meter. Therefore, a distance between the holes 530 in the circuit board 502 should be selected to corresponding transducer positions of the flow meter housing, and also a corresponding distance between ultrasound reflectors serving to reflect ultrasound between the two ultrasound transducers 506. Using SMT mounting of the ultrasound transducers 506, preferably in an automated production line, it is possible to very precisely position the two ultrasound transducers 506 in relation to each other, and thereby provide a good fit to the flow meter housing.

In the shown embodiment on FIGS. 5a, 5b, the ultrasound transducers 506 are in the form of cylindrically shaped piezoelectric elements with plane end parts. The two electrical terminals of the ultrasound transducers 506 are placed on the opposite end parts, one facing the circuit board 502, and one facing away from the circuit board 502. The two electrical terminals may either be the entire end parts or may be only part of the end parts, especially the peripheral part. In the shown example, the conductive path 531 is suited for soldering to the electrical terminal on a periphery of the end part of the ultrasound transducer 506 facing the circuit board 502. The other electrical terminal on the end part of the ultrasound transducer 506 facing away from the circuit board 502 may be connected to the measurement circuit 504 by other means, e.g. using wires soldered to the electrical terminals. Alternatively, an electrically conductive membrane covering both transducers may be used to establish electrical connection between the electrical terminals facing away from the circuit board 502 of both transducers 506, and wherein this electrically conductive membrane is connected to the electronic circuit 504 e.g. by means of a wire soldered to the membrane.

Figure 6A:
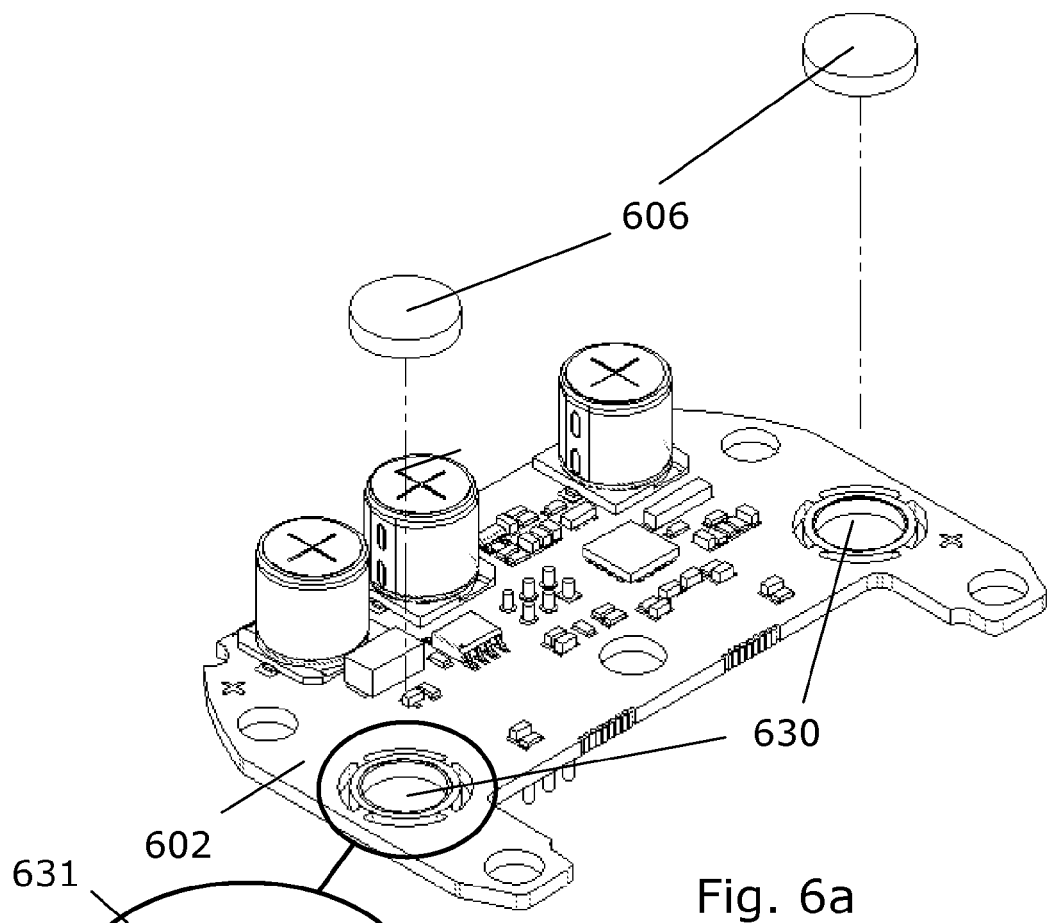
FIGS. 6a and 6b illustrate another SMT embodiment similar to the one of FIG. 5, but with additional through-going openings outside the annular conducting path.
Figure 6B:
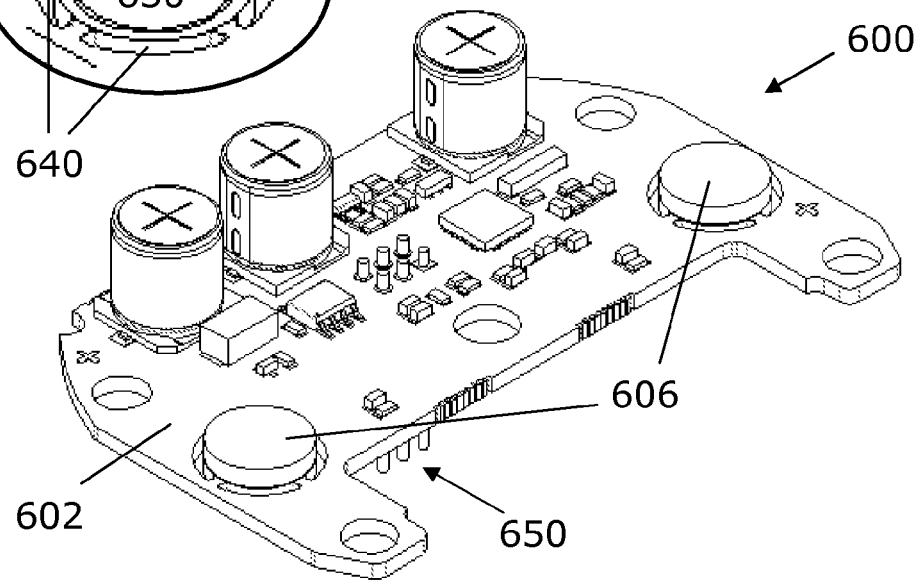

FIGS. 6a and 6b shows a variant of the circuit board of FIGS. 5a and 5b. A testable unit 600 comprising ultrasound transducers 606 in the form of cylindrically shaped piezoelectric element, and a circuit board 602 with measurement electronics 604 serving to operate the ultrasound transducers 606 is provided, preferably by means of an automated SMT process, where all electronic components and the ultrasound transducers 606 are directly soldered to conductive paths of the circuit board 602.

In the magnified view, the circuit board 602 area where the ultrasound transducer 606 is mounted has a circular conductive path 631 suited for connection to one electrical terminal of the ultrasound transducer 606. A through-going opening in the form of a circular hole 603 is in this embodiment accompanied by four narrow through-going openings 640 outside the area with the circular conductive path 631. These openings 640 serve to facilitate adaptation to extensions and contractions of the piezo-electric elements 606. As seen, the piezo-electric elements 606 cover the holes 630, when mounted, whereas the openings 640 are positioned outside the area covered by the piezo-electric elements 606.

Figure 7:
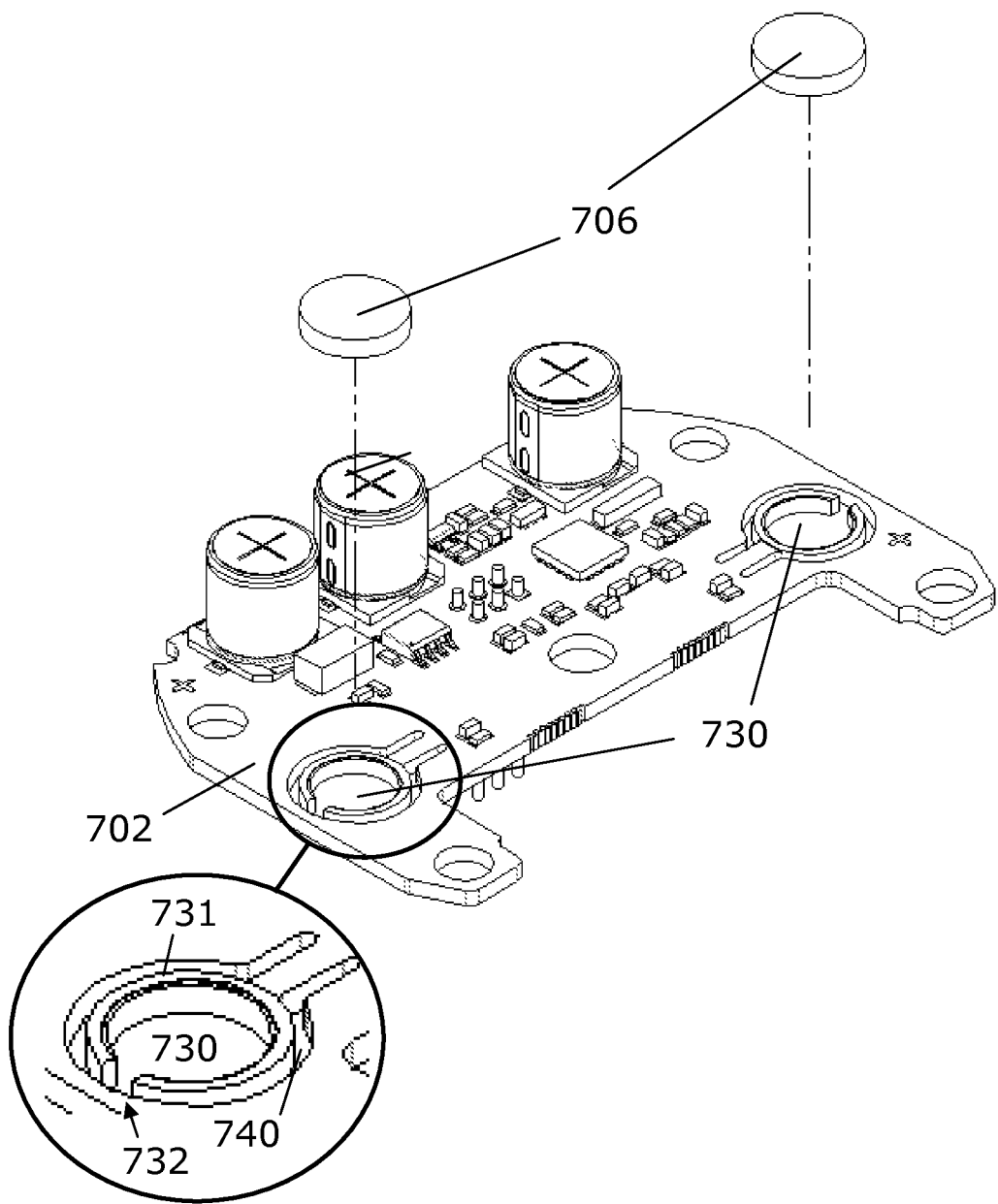
FIG. 7 illustrates yet another SMT embodiment, where a generally annular conducting path is arranged within one through-going opening surrounding the annular conducting path, but where the annular conductor and the underlying circuit board part has a cut so as to better allow for thermal movement during manufacturing.

FIG. 7 illustrates a variant of the circuit board of FIGS. 6a and 6b. In FIG. 7, a generally annular conductor 731 serves for connection to one terminal of the piezo-electric element. A through-going hole 730 inside the conductor 731 and a through-going groove 740 outside the conductor 731, together with a cut 732 in the conductor 731 and the underlying part of the circuit board 702, these holes and grooves serve to effectively absorb extensions and contractions of the piezo-electric elements 706.

FIGS. 8a and 8b illustrate another circuit board 802 variant, where both electrical terminals of the piezo-electric elements 806 are connected to the circuit board 802, again providing a complete flow measurement unit 800 prepared for testing. An annular conductor 831 on a surface of the circuit board is arranged for soldering to a first electrical terminal of the piezo-electric element 806. This conductor 831 has in its vicinity a central through-going hole 830, and around its periphery a through-going groove 840, with the same effect as mentioned for the embodiment of FIG. 7. However, in this embodiment, another conductor 832 on the surface of the circuit board 802 is arranged for soldering to a metal clip 810, i.e. a piece of metal bend into shape. This conductor 832 is positioned outside a periphery of the circular piezo-electric element 806 when placed in its intended position on the circuit board. The metal clip 810 can then be soldered to the conductor 832 in the same SMT process as fixing and electrically connecting the piezo-electric element 806 to the conductor 831. However, the metal clip 810 may alternatively be soldered or conductively glued to the conductor 832 manually after SMT mounting of the other electrical components.

As seen, the metal clip 810 is bent into shape so as to provide electrical contact to a peripheral part of the side of the piezo-electric element 806 facing away from the circuit board, i.e. to the second electrical terminal of the piezo-electric element 806. An advantage of this type of electrical connection of the electronic circuit to the piezo-electric element 806 is that it is suited for being carried out in one single automated SMT mounting process, since the bent metal clip 810 is not mechanically supported by the piezo-electric element 806 during the SMT process, and thus the piezo-electric element and thus the metal clip 810 is not prevented from proper mechanical contact with the solder and the electric path on the circuit board 802 during the SMT process, which may otherwise lead to a poor electrical connection between the metal clip 810 and the electronic circuit on the circuit board 802. In this case electrical contact will be established when the unit 800 is mounted on a housing, since here the metal clip 810 will be pressed against a surface of the housing, thus causing the metal clip 801 to touch the electrical terminal of the piezo-electric element 806. However, it is to be understood that the metal clip 810 may also be shaped to provide immediate contact to the piezo-electric element 806, when soldered or fixed to the conductor 832, without any external force, if preferred.

The combination of directly soldering one electrical terminal of the piezo-electric element 806 to the circuit board 802 and connecting a second electrical terminal via a metal clip soldered to the circuit board 802 is advantageous, since full electrical connection of the piezo-electric element 806 can be established in one single SMT mounting process, if preferred.

Figure 9A:
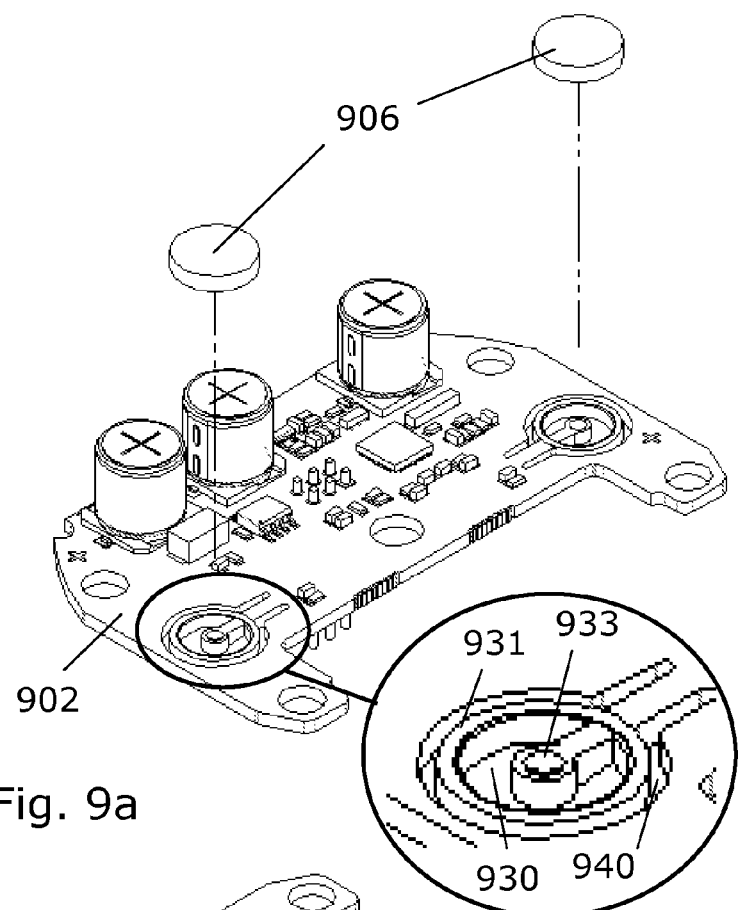
FIGS. 9a and 9b illustrate an SMT embodiment with conducting pads arranged for soldering to respective concentrically positioned electrical terminals of the ultrasound transducer, thus allowing the transducer to be fully SMT mounted to the circuit board.
Figure 9B:
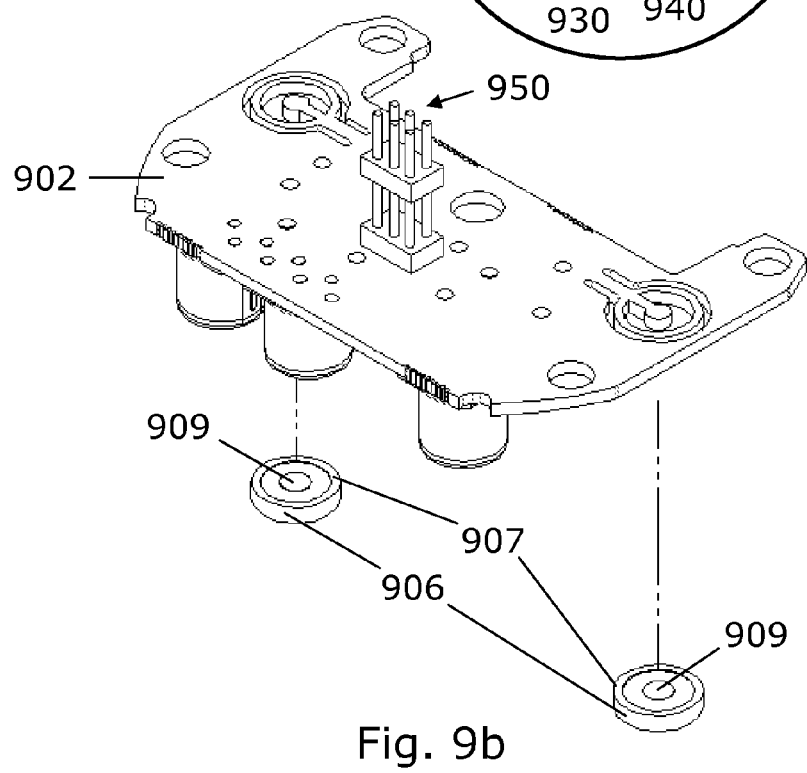

FIGS. 9a and 9b illustrate a circuit board 902 variant suited for ultrasound transducers 906 in the form of circular piezo-electric elements 906 with both electrical terminals 907, 909 placed on a surface of one plane side, and thus suited for direct soldering to respective conductors 931, 933 on a surface of the circuit board 902. In FIG. 9a the circuit board 902 is seen from the component side, while FIG. 9b illustrates the opposite side of the circuit board 902 where the external electrical terminal 950 of the flow measurement unit is visible, here illustrated as a 6-pin plug, however external interfaces with fewer or more electrical terminals may be preferred. In embodiments with an on-board battery, such external interface may be purely wireless.

In the illustrated variant, the two electrical terminals 907, 909 are concentrically arranged on one surface of the piezo-electric element 906. The first electrical terminal 907 has an annular shape and is arranged on a peripheral part of the plane surface of the piezo-electric element 906, while the second electrical terminal 909 is positioned in a central part of the surface, inside the first terminals 907. The conductor 933 is placed within the conductor 931 and separated by a through-going opening 930. Outside the conductor 931, a through-going opening 940 is also provided, with the same effect as previously mentioned.

The magnified view illustrates the corresponding first conductor 931 on the surface board has an annular shape suited to fit the shape of the first terminal 907, while the second conductor 933 is positioned inside the annular first conductor 931 so as to fit the position of the second terminal 909.

The embodiment illustrated in FIGS. 9a and 9b is advantageous since it allows full electrical connection of the ultrasound transducer 906 to the circuit board 902 in one single SMT mounting process without involving further components than solder. However, the illustrated transducer type 906 requires the correct side of the transducer 906 to face the circuit board 902 in order to work. However, if this is taken into account, the mechanical fixing and electrical connection of the transducer 906 can be combined in an elegant way in one single SMT process.

It is to be understood that the details of the arrangement of the electrically conductive portions on the circuit boards illustrated in FIGS. 5-9 may be combined in any way to provide a desired configuration, depending on the selected type of ultrasound transducer.

The invention provides a highly versatile stand-alone unit for a large variety of applications where a flow rate of a fluid is to be measured. A simple electrical interface can be provided, e.g. where the measured flow rate is output as pulses. This interface may be reduced down to one single electrical pin, see e.g. European patent application publication No. EP 2 042 837, e.g. with part of the casing being a metal serving as electrical ground connector. Hereby, the unit is easy to fit into different applications. In some embodiments, a battery is provided within the water-tight casing, thus allowing a completely self-contained flow meter unit with a simple electric interface.

Further, the range of applications is extended due to the rather compact size of the unit, especially in versions where the electronic circuit is refined to allow a high measurement accuracy with a limited distance between the first and second ultrasound transducers, e.g. as described in European patent application EP 2 339 301. This means that the unit can be used in applications where only a limited space is available for the flow rate sensor.

Examples of relevant applications are: consumption meters for charging purposes, measurement of blood flow in medical examination or surveillance, ingredient flow within the food industry, flow of water, air or fuel in a machinery (e.g. a vehicle), flow provided to single sources or groups of heating/cooling elements (or the related heating/cooling power based on measurement of the flow) as feedback to heating/cooling control systems.

In all cases, such applications can profit from high precision fluid flow measurements which can be provided at low cost since the flow meter is suited for full or at least highly automated mass production.

To sum up the invention provides an ultrasound flow meter unit arranged to measure a fluid flow rate with one or more ultrasound transducers (606), and a circuit board (602) with an electronic circuit arranged to operate the ultrasound transducer(s) (106, 306). The ultrasound transducer (606), e.g. in the form of a piezo-electric element, is mechanically fixed to the circuit board (602) by a first electrically conducting fixing means which additionally serve(s) to provide an electrical connection between an electrical terminal of the transducer (606) and the electronic circuit. Hereby a functional flow measurement unit (600) is provided which can be tested prior to assembly with a flow meter housing etc. Preferably, a set of ultrasound transducers (106, 306) are soldered directly onto electrically conducting paths (631) on a surface of the circuit board (602) being in electrical connection with the electronic circuit, e.g. in a single SMT mounting process together with mounting of all other electronic components on the circuit board (602). Through-going openings (630, 640) of the circuit board (602) in the vicinity of these conducting paths (631) serve to provide thermal elasticity. A metal clip soldered to the circuit board (602) may serve to electrically connect a second electrical terminal of the transducer (606) to the electronic circuit.

In the following, embodiments E1-E18 describe additional possible embodiments of the invention.

E1. An ultrasound flow meter arranged to measure a flow rate of a fluid flowing through a measuring tube, the flow meter comprising
- a housing (620) with the measuring tube (614) arranged inside, and
- a mechanically separate unit (100, 300) arranged in relation to the housing, the mechanically separate unit (100, 300) comprising
  - at least one ultrasound transducer (106, 306), and
  - a circuit board (102, 302) with an electronic circuit (104, 304) arranged for operating the at least one ultrasound transducer (106, 306), wherein at least one fixing member (110, 310) is attached to the circuit board (102, 302), wherein the fixing member (110, 310) serves to limit relative movement between the circuit board (102, 302) and the ultrasound transducer (106, 306), such as the fixing member (110, 310) serving to fix the ultrasound transducer (106, 306) to the circuit board (110, 310).

E2. Ultrasound flow meter according to E1, wherein the ultrasound transducer (106, 306) is kept in position by the fixing member (110, 310) outside a plane defined by the circuit board (102, 302, such as on a surface of the circuit board (102, 302).

E3. Ultrasound flow meter according to E1, wherein the circuit board (102, 302) comprises an edge (108, 308) shaped to fit at least a part of the ultrasound transducer (106, 306), and wherein the ultrasound transducer (106, 306) is kept in position by the fixing member (110, 310) such that a plane defined by the circuit board (102, 302) intersects through the ultrasound transducer (106, 306), when mounted for normal operation.

E4. Ultrasound flow meter according to E3, wherein said edge (108, 308) of the circuit board serves, together with the fixing member (110, 310), to fix the position of the ultrasound transducer (106, 306) in relation to the circuit board (102, 302).

E5. Ultrasound flow meter according to E3 or E4, wherein said edge is an edge of a through-going hole (108, 308) through the circuit board (102, 302), wherein the through-going hole (108, 308) is shaped to fit a size of the ultrasound transducer (106, 306).

E6. Ultrasound flow meter according to any of E1-E5, wherein the fixing member (110, 310) comprises an electrically conductive portion, and wherein this electrically conductive portion serves to electrically connect the circuit board (102, 302) and the ultrasound transducer (106, 306).

E7. Ultrasound flow meter according to E6, wherein separate first and second parts of the fixing member (110, 310) serve to provide respective first and second electrical connections between the ultrasound transducer (106, 306) and the circuit board (102, 302).

E8. Ultrasound flow meter according to any of E1-E7, wherein the fixing member (110, 310) comprises one or more clips attached to the circuit board (102, 302), such as one or more metal clips.

E9. Ultrasound flow meter according to any of E1-E8, wherein the fixing member (110, 310) comprises one or more solderings serving to attach the ultrasound transducer (106, 306) to the circuit board (102, 302).

E10. Ultrasound flow meter according to any of E1-E9, comprising first and second ultrasound transducers (106, 306) fixed to the circuit board (102, 302) by respective first and second parts of the fixing member (110, 310).

E11. Ultrasound flow meter according to E10, wherein the circuit board (302) and the fixing member (310) serve to fix the first and second ultrasound transducers (306) in position relative to each other, and wherein a distance (722) between the first and second ultrasound transducers (306) matches a distance (724) between corresponding first and second transducer receiving positions of the housing (620).

E12. Ultrasound flow meter according to any of E1-E11, wherein the housing (620, 820) is formed by metal, such as brass or stainless steel, or by a polymeric material.

E13. Consumption meter comprising a flow meter according to any of E1-E12, wherein the consumption meter is one of: a heating meter, a cooling meter, a water meter, or a gas meter.

E14. A method of manufacturing an ultrasound flow meter, the method comprising
- forming a mechanically separate unit comprising an ultrasound transducer and a circuit board with an electronic circuit used for controlling the ultrasound transducer by mounting the ultrasound transducer relative to the circuit board by means of a fixing member serving to limit relative movement between the ultrasound transducer and the circuit board, and
- mounting the mechanically separate unit to a housing arranged for fluid flow.

E15. Method according to claim E14, comprising mounting the ultrasound transducer to the circuit board by means of one or more clips, such as metal clips.

E16. Method according to E14 or E15, comprising soldering the ultrasound transducer to the circuit board, such as by means of a Surface Mounting soldering process.

E17. Method according to any of E14-E16, comprising a step of testing a function of the mechanically separate unit prior to mounting the mechanically separate unit to the housing arranged for fluid flow.

E18. Method according to any of E14-E17, comprising mounting first and second ultrasound transducers relative to the circuit board by means of respective first and second parts of the fixing member.

Although the present invention has been described in connection with preferred embodiments, it is not intended to be limited to the specific form set forth herein. Rather, the scope of the present invention is limited only by the accompanying claims.

In this section, certain specific details of the disclosed embodiments are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. An ultrasound flow meter unit arranged to measure a fluid flow rate, the unit comprising:

a first ultrasound transducer having a first and a second electrical terminal, and a circuit board with an electronic circuit arranged thereon for operating the first ultrasound transducer, wherein the circuit board comprises a first conducting path electrically connected to the first electrical terminal, and to the electronic circuit, wherein the ultrasound transducer is a monolithic body of piezo-electric material with one surface in contact with a surface of the circuit board, and wherein the monolithic body is mechanically fixed to the circuit board by a first electrically conducting fixing means, which provides the electrical connection between the first electrical terminal and the first conducting path.

2. The ultrasound flow meter unit according to claim 1, wherein the first fixing means comprises at least one of: solder, electrically conducting glue, or an electrically conducting clip.

3. The ultrasound flow meter unit according to claim 1, wherein the circuit board has one or more through-going openings partly or entirely covered by the first ultrasound transducer when fixed to the circuit board.

4. The ultrasound flow meter unit according to claim 3, wherein a part of the first conducting path is arranged in the vicinity of at least one of the through-going opening(s) in the circuit board.

5. The ultrasound flow meter unit according to claim 1, wherein the ultrasound transducer is mounted on top of a through-going hole of the circuit board or on top of a non through-going cavity of the circuit board.

6. The ultrasound flow meter unit according to claim 4, wherein the monolithic body is fixed to the circuit board by soldering the first conducting path to the first electrical terminal on a periphery of the end part of the ultrasound transducer facing the circuit board.

7. The ultrasound flow meter unit according to claim 5, wherein a through-going opening is accompanied by openings positioned outside the area covered by the first ultrasound transducer when fixed to the circuit board.

8. The ultrasound flow meter unit according to claim 7, wherein a through-going opening in the form of a circular hole surrounded by a circular conducting path, is accompanied by four narrow through-going openings outside the area with the circular conductive path.

9. The ultrasound flow meter unit according to claim 7, wherein a generally annular conductor with a cut serves for connection to the first terminal of the ultrasound transducer, and wherein a through-going opening is arranged inside the conductor and a through-going grove is arranged outside the conductor.

10. The ultrasound flow meter unit according to claim 7, wherein an annular conductor serves for connection to the first terminal of the ultrasound transducer, and wherein a through-going opening is arranged inside the conductor and a through-going grove is arranged outside the conductor.

11. The ultrasound flow meter unit according to claim 1, wherein a second conducting path on the surface of the circuit board serves to electrically connect the electronic circuit with the second electrical terminal of the first ultrasound transducer.

12. The ultrasound flow meter unit according to claim 11, wherein a metal clip serves to electrically connect the second conducting path to the second electrical terminal of the first ultrasound transducer.

13. The ultrasound flow meter unit according to claim 11, wherein the second conducting path is placed within the first conducting path and separated by a through-going opening.

14. The ultrasound flow meter unit according to claim 1, wherein the ultrasound flow meter further comprises a second ultrasound transducer, wherein the electronic circuit is further arranged for operating the second ultrasound transducer, wherein the second ultrasound transducer is mechanically fixed to the circuit board by a second electrically conducting fixing means, which additionally serve(s) to provide an electrical connection between at least one electrical terminal of the second ultrasound transducer and the electronic circuit, and wherein both of the first and second ultrasound transducers are mechanically fixed to the same side of the circuit board.

15. The ultrasound flow meter unit according to claim 14, comprising a substantially watertight membrane arranged around the circuit board and the first and second ultrasound transducers, and wherein a plug with a plurality of electrical terminals penetrates through the membrane so as to allow external connection to the electronic circuit, wherein at least a part of the membrane is electrically conducting and serves to electrically connect the second electrical terminal of the first ultrasound transducer with a second electrical terminal of the second ultrasound transducer.

16. A flow meter arranged to measure a flow rate of a fluid flowing through a measuring tube, wherein the flow meter comprises:

a housing with the measuring tube arranged inside, and an ultrasound flow meter unit according to claim 1 arranged in relation to the housing.

17. The flow meter according to claim 16, wherein said flow meter is a heat meter, a cooling meter, a water meter, or a gas meter.

* * * * *